(12) United States Patent
Sindel

(10) Patent No.: US 7,270,690 B1
(45) Date of Patent: Sep. 18, 2007

(54) SEPARATOR WITH VANE ASSEMBLY AND FILTER ARRANGEMENT

(75) Inventor: Allen W. Sindel, Whitehouse, TX (US)

(73) Assignee: Harbison-Fischer, Inc., Crowley, TX (US)

( * ) Notice: Subject to any disclaimer, the term of this patent is extended or adjusted under 35 U.S.C. 154(b) by 313 days.

(21) Appl. No.: 10/890,669

(22) Filed: Jul. 14, 2004

Related U.S. Application Data

(63) Continuation-in-part of application No. 10/242,117, filed on Sep. 12, 2002, now Pat. No. 6,757,926.

(51) Int. Cl.
*B01D 45/00* (2006.01)
*B01D 45/08* (2006.01)

(52) U.S. Cl. .............. 55/320; 55/321; 55/325; 55/327; 55/440; 55/443; 55/337; 95/268

(58) Field of Classification Search .......... 55/320–321, 55/325, 327, 440, 443; 95/268
See application file for complete search history.

(56) References Cited

U.S. PATENT DOCUMENTS

| | | | |
|---|---|---|---|
| 3,291,385 A | | 12/1966 | Williams et al. |
| 3,338,035 A | * | 8/1967 | Dinkelacker ............... 55/440 |
| 3,813,855 A | * | 6/1974 | Hill et al. .................. 55/440 |
| 3,849,095 A | | 11/1974 | Regehr |
| 3,870,488 A | | 3/1975 | Arndt et al. |
| 3,888,644 A | | 6/1975 | Holland et al. |
| 3,953,183 A | | 4/1976 | Regehr |
| 4,180,391 A | | 12/1979 | Perry, Jr. et al. |
| 4,297,116 A | | 10/1981 | Cusick |
| 4,430,101 A | | 2/1984 | Sixsmith |
| 4,443,233 A | | 4/1984 | Moran |
| 4,543,108 A | | 9/1985 | Wurz |
| 4,557,740 A | | 12/1985 | Smith |
| 4,581,051 A | | 4/1986 | Regehr et al. |
| 5,112,375 A | | 5/1992 | Brown |
| 5,846,271 A | | 12/1998 | Flynn et al. |
| 5,919,284 A | | 7/1999 | Perry, Jr. et al. |
| 6,168,647 B1 | | 1/2001 | Perry, Jr. et al. |
| 2003/0150324 A1 | * | 8/2003 | West ......................... 95/268 |

\* cited by examiner

*Primary Examiner*—Duane Smith
*Assistant Examiner*—Ives Wu
(74) *Attorney, Agent, or Firm*—Geoffrey A. Mantooth

(57) ABSTRACT

The separator has a vane assembly made up of a number of corrugated vanes that provide serpentine paths for the gas stream therethrough. As the gas stream flows through the serpentine paths, it changes direction and liquid in the gas stream impacts the surfaces of the vanes. The upstream section of the vane assembly has roughened surfaces to decrease the surface tension of the liquid, thereby causing the liquid to coalesce. The downstream section of the vane assembly has smooth surfaces so as to increase the surface tension of the liquid. The vane assembly is followed by filters, which capture the liquid that passes through the vane assembly. The vane assembly coalesces the liquid to enable the filters to operate more effectively.

4 Claims, 9 Drawing Sheets

SEPARATOR WITH VANE ASSEMBLY AND FILTER ARRANGEMENT

This application is a continuation-in-part of U.S. application Ser. No. 10/242,117, filed Sep. 12, 2002 now U.S. Pat. No. 6,757,926.

FIELD OF THE INVENTION

The present invention relates to apparatuses and methods for separating liquid from gas.

BACKGROUND OF THE INVENTION

Separators for separating liquid from gas are well known in the art. Separators are used, for example, to dry natural gas. The gas has liquid, such as water, entrained therein. If the natural gas is transported through pipelines in a "wet" condition, the water acts to corrode the steel pipelines, causing possible ruptures and explosions. Thus, it is desirable to economically and effectively remove the water from natural gas, and in general, to remove various types of liquids from various types of gasses.

One prior art type of separator is taught by Hill et al., U.S. Pat. No. 3,813,855. The Hill patent teaches shaped vanes for channeling a fluid flow in a serpentine path. This path creates impact regions and sheltered regions, wherein the liquid in the fluid flow impacts the vanes and collects in the sheltered regions. Another prior art shaped separator is shown in Brown, U.S. Pat. No. 5,112,375.

The serpentine path separators typically require additional means to aid in the separation process. For example, in Regeher, U.S. Pat. No. 3,953,183, serrations are used on the vane surfaces for capturing and draining coalesced liquid. These type of separators are expensive to manufacture.

Another prior art technique uses serpentine path separators in conjunction with a fine wire mesh located at the inlet end of the vanes. The wire mesh increases the effectiveness of the separation; the fluid passes through the wire mesh before entering the vane channels and liquid coalesces on the wire mesh, dropping to the bottom of a tank containing the separator vanes.

The problem with using a wire mesh is that the mesh tends to become clogged with particulates and solids in the fluid stream. When the mesh becomes clogged or partially blocked, the overall efficiency in the separator becomes reduced.

I have invented a separator for separating liquid from gas in a fluid flow. The separator has vanes that form a serpentine path from the fluid flow. An upstream portion of the vanes has roughened surfaces in order to reduce the surface tension of liquid and allow the liquid entrained in the fluid flow to coalesce into drops that are sufficiently large so as to allow separation of the liquid from the gas.

There are some applications where my separator, by itself, does not remove all of the liquids and contaminants in the fluid stream. One such application involves relatively low pressure gas.

Low pressure gas passes through a compressor in order to boost the pressure to suitable values for transportation. Compressors are particularly susceptible to contaminants in the fluid stream. One contaminant is soap. Wells are soaped to increase the flow rate; the soap lowers the resistance of the gas. Another contaminant is salt that is produced by salt water wells. The soap and salt contaminate compressors, necessitating frequent overhauls and other maintenance. Such compressor maintenance results in down time and increased operating costs.

SUMMARY OF THE INVENTION

It is an object of the present invention to provide a separator for separating liquid from gas in a fluid flow.

It is another object of the present invention to provide a separator that removes contaminants such as salt and soap from a fluid flow.

The present invention provides a separator for separating liquid from gas. The separator comprises a vessel having an inlet port, an outlet port and a flow path between the inlet and outlet ports. A vane assembly is located in the flow path and has vanes. The vanes are spaced apart from and adjacent to one another and form a serpentine path between any two adjacent vanes. A filter is located in the flow path between the vane assembly and the outlet port.

In accordance with one aspect of the present invention, the vane assembly has an inlet section with roughened surfaces on the vanes and an outlet section with smooth surfaces on the vanes, with the roughened surfaces being more wettable than the smooth surfaces.

In accordance with another aspect of the present invention, the filter is accessible through an access port in the vessel.

In accordance with still another aspect of the present invention, the vessel has two ends, with the inlet port being in one end and the access port being in the other end, the outlet port being located between the vane assembly and the filters.

In accordance with another aspect of the present invention, the filter is a second stage filter, further comprising a first stage filter located in the flow path and separate from the second stage filter.

In accordance with still another aspect of the present invention, the vane assembly has an inlet section with roughened surfaces on the vanes and an outlet section with smooth surfaces on the vanes, with the roughened surfaces being more wettable than the smooth surfaces. The filter is accessible through an access port in the vessel. The vessel has two ends, with the inlet port being in one end and the access port being in the other end, with the outlet port being between the vane assembly and the filter.

The present invention also provides a method of separating liquid from a gas stream comprising the step of directing the gas stream along a path and causing the gas stream to change direction so as to impact the liquid and the gas stream onto the sides of the path and cause the liquid to coalesce. Then, the gas is directed, with the coalesced liquid, through a filter element so as to remove the coalesced liquid.

In accordance with one aspect of the present invention, the step of directing the gas stream along a path further comprises flowing the liquid over a roughened surface on the sides of the path and reducing a surface tension of the liquid to cause a coalescing of the liquid.

DESCRIPTION OF THE PREFERRED EMBODIMENTS

Figure 1:
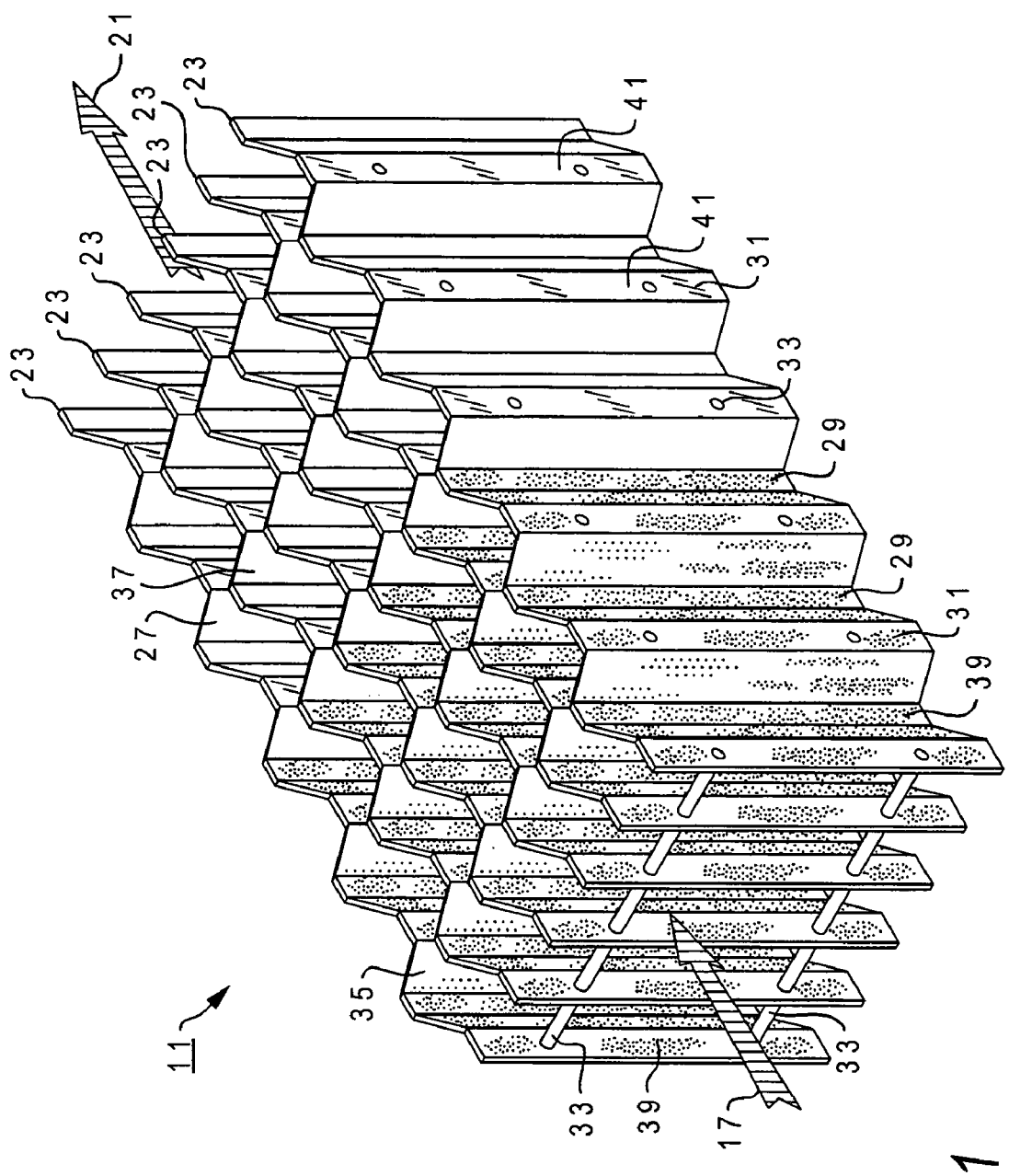
FIG. 1 is an isometric view of an array of vanes of the separator of the present invention, in accordance with a preferred embodiment.
Figure 4:
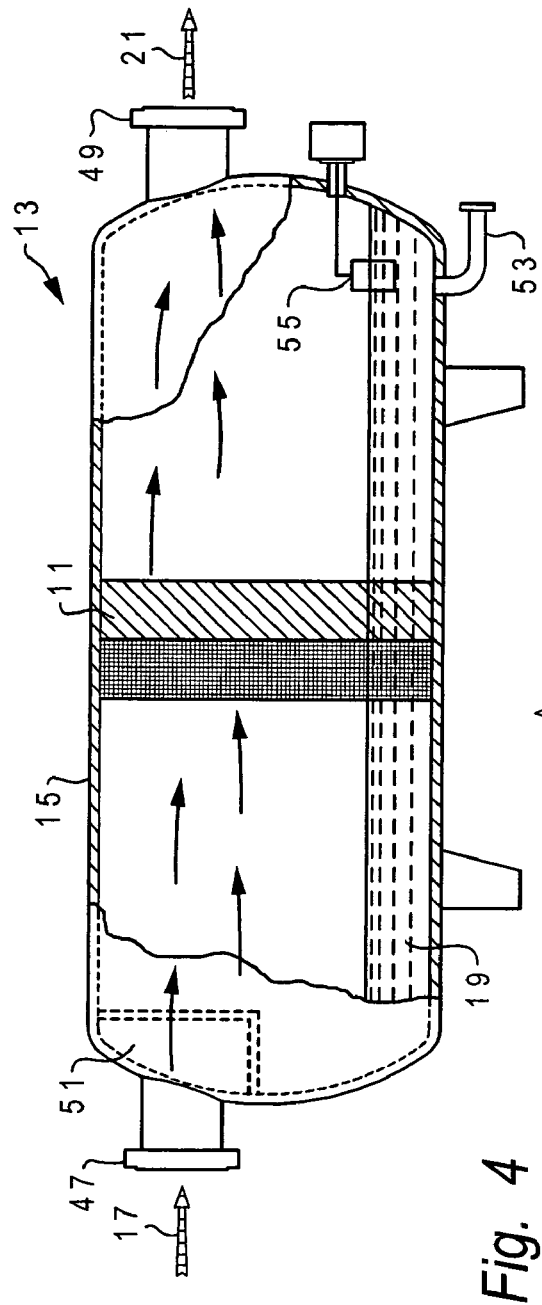
FIG. 4 is an elevational cross-sectional view of a separator vessel that utilizes the vane array of FIG. 1 or 2.

In FIG. 1, there is shown the vane assembly 11 in accordance with one embodiment. The vane assembly 11 is one component of a separator 13, such as is shown in FIG. 4. The vane assembly 11 is contained within a vessel 15 and fluid 17 is passed through the vane assembly. The fluid 17 contains gas and entrained liquid. The liquid 19 coalesces in the vane assembly 11, falling or draining down into the bottom of the separator vessel 15, while the gas 21 exits.

The vane assembly has a number of vanes 23 (see FIG. 1). With the vane assembly 11 of FIG. 1, the vanes 23 are generally parallel to one another. With the vane assembly 25 of FIG. 3, the vanes 23 extend in generally radial directions from a center.

The vane assemblies 11, 25 provide serpentine paths 27 (see FIGS. 1-3) for the fluid to travel through. Such serpentine paths entice the liquid to separate from the gas. Serpentine type assemblies are shown in U.S. Pat. Nos. 3,813,855 and 5,112,375, the complete disclosures of which are incorporated herein by reference. The vane assemblies of the present invention are designed to further enhance the coalescing of liquid, while providing for optimum flow rates.

The vane assembly 11 shown in FIG. 1 has plural vanes 23. The assembly 11 can of course have more or less vanes than what are shown in the Figs. Each vane 23, or plate, is corrugated, wherein as shown with reference to the orientation of FIG. 2, each vane has parallel and alternating ridges 29 and grooves 31. The vanes 23 are located adjacent to each other so that the ridges 29 of any particular vane are aligned with the ridges of adjacent vanes. Likewise, the grooves 31 of any particular vane are aligned with the grooves of the adjacent vanes. The vanes are spaced apart from each other so as to create a sinuous path 27 between two adjacent vanes (see FIG. 2). The vanes are coupled together with connecting rods 33 (FIG. 1) that are spaced throughout the vane assembly. (FIG. 2 does not show any connecting rods to better illustrate the flow of fluid therethrough.)

When assembled, the vane assembly 11 has an inlet end section 35 and an outlet end section 37. (In FIGS. 1-3, the inlet end section 35 is shown by stippling.) The inlet end section 35 has roughened surfaces 29 on both sides of each vane, while the outlet end section 37 has smooth surfaces 41 on both sides of each vane.

The vanes 23 can be made of a variety of materials such as stainless steel, carbon steel or plastic, depending on the fluid that is to flow through the separator. Certain fluid streams contain or form acids. For example, if a fluid stream contains sulfuric acid, then stainless steel is preferred for the vanes. If the fluid contains carbon dioxide and carbolic acid may form, then a plastic such as polypropylene is preferred.

The steel corrugated vanes typically have smooth surfaces 41 resulting from fabrication, which includes a cold rolling step. Cold rolling provides a smoother surface than does hot rolling.

The inlet end section 35 of the vanes are roughened in order to aid in the coalescing of liquid droplets. Roughening occurs, in the preferred embodiment, by subjecting the vane to a flow or blast of blasting media (such as sand or grit). The portion of the vane that is to remain smooth is masked off from the blasting media. Both sides of the vane in the inlet end section 35 are subjected to the blasting media to achieve the roughened surface 39 on each vane side. In the preferred embodiment, the inlet end section is blasted to achieve roughened surfaces 39 with a roughness profile of 2-6 mils anchor pattern. The anchor pattern is defined by the Structure Steel Painting Council (SSPC). Other roughness measurements or criteria can be used. Plastic vanes can be molded with roughened surfaces or the roughened surfaces can be made by blasting.

The treated vanes 23 are then aligned with respect to each other, so that the ridges 29 of a vane are aligned with the ridges of the other vanes and the grooves likewise aligned. Also, the vanes are oriented so that the roughened surfaces 39 are all located together at the same end. The vanes are then connected together by connecting rods 33.

Figure 2:
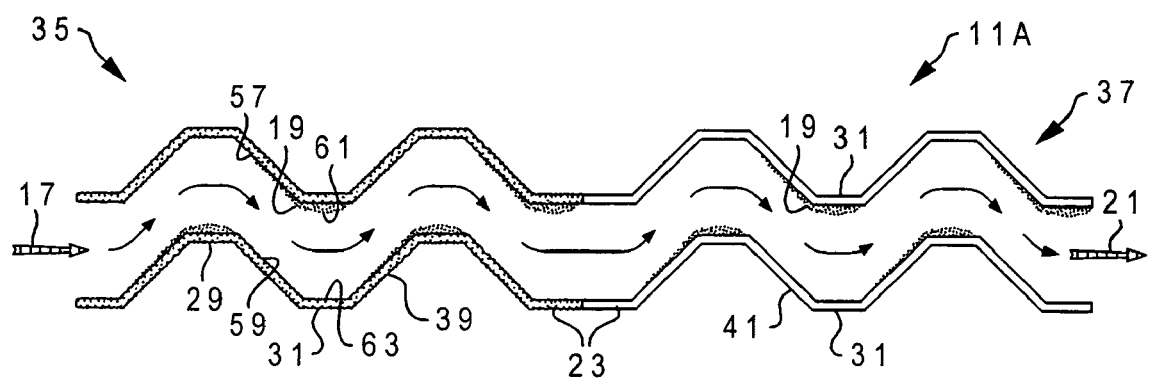
FIG. 2 is a plan view of two of the separator vanes, in accordance with another embodiment.

Alternatively, a vane assembly 11A can be made by utilizing two independent sections to make a single vane assembly. Referring to FIG. 2, the sections 35, 37 are manufactured independently of each other. The inlet end section 35 has vanes with roughened surfaces 39 while the outlet end section 37 has vanes with smooth surfaces 41. The sections 35, 37 are located end-to-end such that the downstream edges of the inlet end section 35 vanes abut the upstream edges of the outlet end section 37 vanes. The edges of the vanes need not be perfectly aligned; some misalignment can be tolerated. The vane assembly 11A can be used in lieu of the vane assembly 11.

The vanes are constructed into an assembly and adapted to a variety of horizontal, vertical or center centrifugal designs. The vanes need not be perfectly vertical and can in fact be angled at up to thirty degrees from the vertical. When so angled, the vanes will lean and will effectively increase the surface area of the overall vane assembly for a given height.

FIGS. 4-7 illustrate separators having the vane assembly 11 placed into a vessel. The vessel has an inlet 47 and an outlet 49. The inlet end section 35 of the vane assembly 11 is located nearest the inlet 47, while the outlet end section 37 is located nearest the outlet 49. Thus the fluid 17 flows from the inlet 47 into the inlet end section 35, and from the outlet end section 37 to the outlet 49.

FIG. 4 shows a separator with a horizontal vessel 15. Downstream of the inlet 47 and inside of the vessel is an initial impact surface or diverter 51. Droplets contained in the incoming fluid stream will impact the diverter 51 and fall to the bottom of the vessel, pooling at some level. An outlet pipe 53 is provided for draining the liquid from the vessel. The outlet pipe is controlled by a float valve 55. Thus, when the level of the liquid 19 becomes high, the float valve 55 opens and liquid drains out through the outlet pipe 53.

The fluid passes through the vane assembly 11 and the gas 21 exits the vessel through the outlet 49.

Referring to FIG. 2, the fluid flows between the individual vanes 23 of the vane assembly 11, following the serpentine path 27 bounded by the vanes. The cross-sectional areas between the vane surfaces 57, 59 are smaller than the cross-sectional areas between the vane surfaces 61 and 63. Thus, when the fluid flows from the areas of the path 27 between surfaces 57 and 59, to the areas between surfaces 61 and 63, the pressure drops. In addition, the direction of fluid flow changes, changing the velocity of the fluid and creating eddies in the fluid flow along surface 61. Liquid 19 in the fluid stream impacts on the surface 59 and flows onto surfaces 63, where the eddies are located. The fluid flowing in the paths 27 exhibits elements of laminar flow (Poiseuille flow) and turbulent flow.

Figures 2A, 2B:
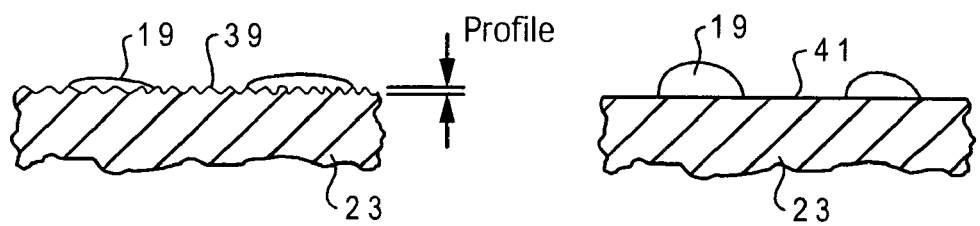
FIG. 2A is a cross-sectional view of a portion of a vane, showing the roughened surface.
FIG. 2B is a cross-sectional view of a portion of a vane, showing the smooth surface.

The roughened surfaces 39 of the inlet end section 35 are wetting surfaces that reduce the surface tension of the liquid. Thus, the liquid that impacts the surfaces 57, 61 in the inlet end section 35 planes or spreads on the surface 39 (see FIG. 2A), rather than forming beads. This spreading of the liquid causes the individual portions of the liquid to coalesce into larger portions. The roughened surfaces have a high surface area, relative to the smooth surfaces. For a given unit area, the surface area of the roughened surfaces 39 is higher than the surface area of the smooth surfaces 41. For example, for a square centimeter segment of a smooth surface, the surface area of the segment will be one square centimeter. However, for a square centimeter segment of a roughened surface, the surface area of the segment will be greater than one square centimeter due to the peaks and valleys.

The roughness profile of the roughened surfaces 49 is typically expressed in mils of depth between the peaks and valleys. The profile should be deep enough to wet the liquid, allowing the liquid to form a film. The profile preferably is not so deep as to impede the migration of the liquid to the outlet end section 37.

The liquid moves along the roughened surfaces 39 flowing along the ridges 29 and grooves 31, pushed by the fluid flow. Wetting the liquid, before large scale coalescing forms large masses of liquid, minimizes the possibility of the liquid reentering the fluid stream. When the liquid enters the outlet end section 37 of the vane assembly, it contacts the non-wetting surface, or smooth surface 41, of the vanes. Consequently, the surface tension of the liquid increases. The liquid forms relatively large drops (see FIG. 2B) on the surface, with a weakened adherence to the vane. The liquid drops are large enough so that they are drawn down the vanes by gravity. The force of the fluid flow blowing on the drops may enhance the drops leaving the vanes. The drops fall to the bottom of the vessel.

Thus, the vane assembly is able to precipitate out of the fluid stream small fluid particles, coalesce those particles into bigger drops using a wettable surface, transport those larger drops to a nonwetting surface where they bead up due to increased surface tension and allow those drops to drain by gravity.

Figure 5:
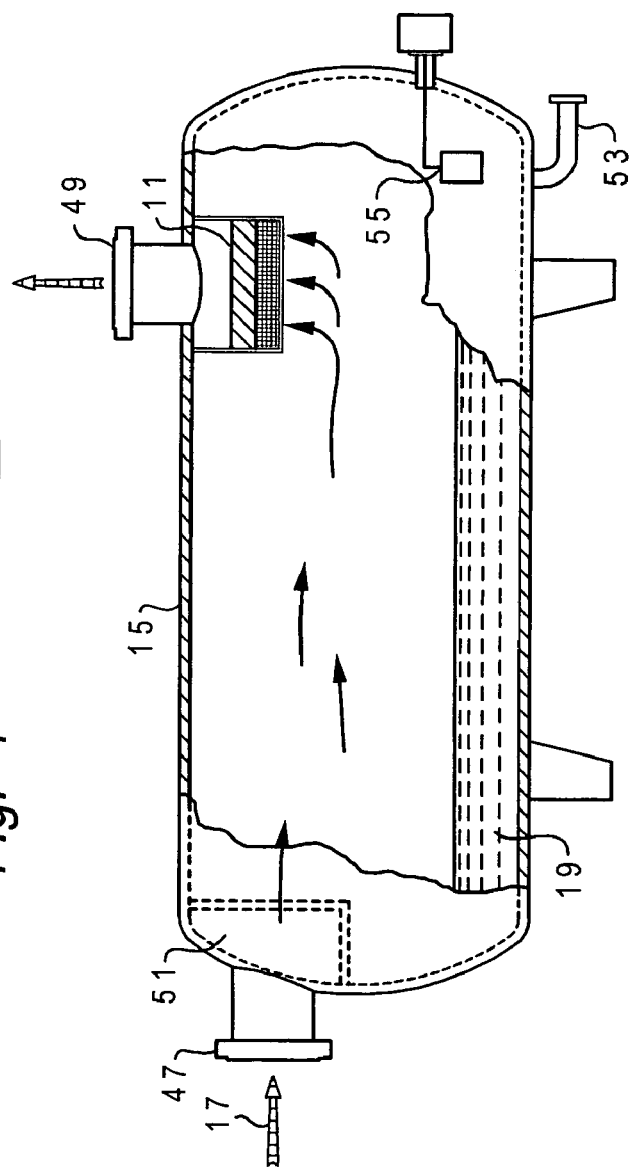
FIG. 5 is an elevational cross-sectional view of a separator vessel, in accordance with another embodiment, that utilizes the vane array of FIGS. 1 or 2.

FIG. 5 shows a separator with a horizontal vessel 15 that is substantially the same as the separator of FIG. 4. The outlet is vertical in FIG. 5, instead of horizontal, as shown in FIG. 4. The vane assembly 11 is located below the outlet 49, with the roughened inlet end section 35 below the smooth outlet section 37. Flow through the vane assembly is vertical, whereas in FIG. 4, flow through the vane assembly is horizontal.

Figure 6:
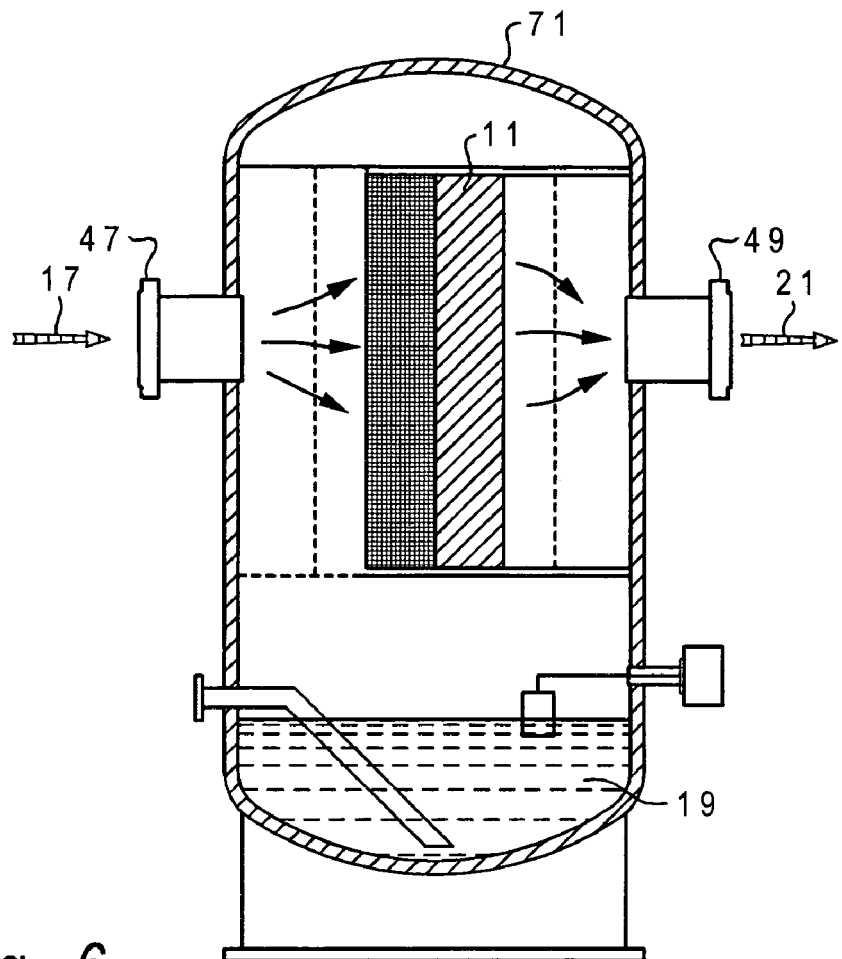
FIG. 6 is an elevational cross-sectional view of a separator vessel, in accordance with another embodiment, that utilizes the vane array of FIG. 1 or 2.

In FIG. 6, the separator has a vertical vessel 71, with the inlet and outlet 47, 49 on the sides. The vane assembly 11 is located inside of the vessel. Distributor structure can be used to direct flow to and away from the vane assembly.

Figure 7:
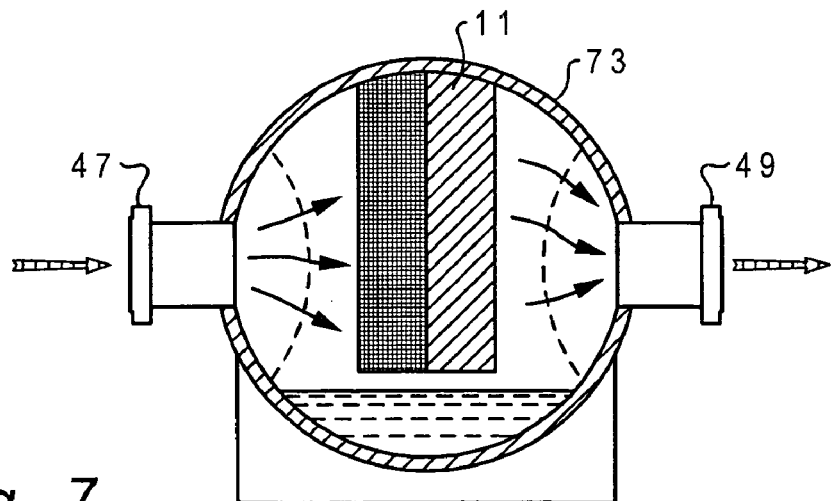
FIG. 7 is an elevational cross-sectional view of a separator vessel, in accordance with another embodiment, that utilizes the plate array of FIG. 1 or 2.

FIG. 7 shows a horizontal vessel 73 similar to that shown in FIGS. 4 and 5. The inlet and outlet 47, 49 are located at the sides, instead of at the ends, as in FIG. 4. The vane assembly 11 is located between the inlet and outlet with distributor structure.

Figure 3:
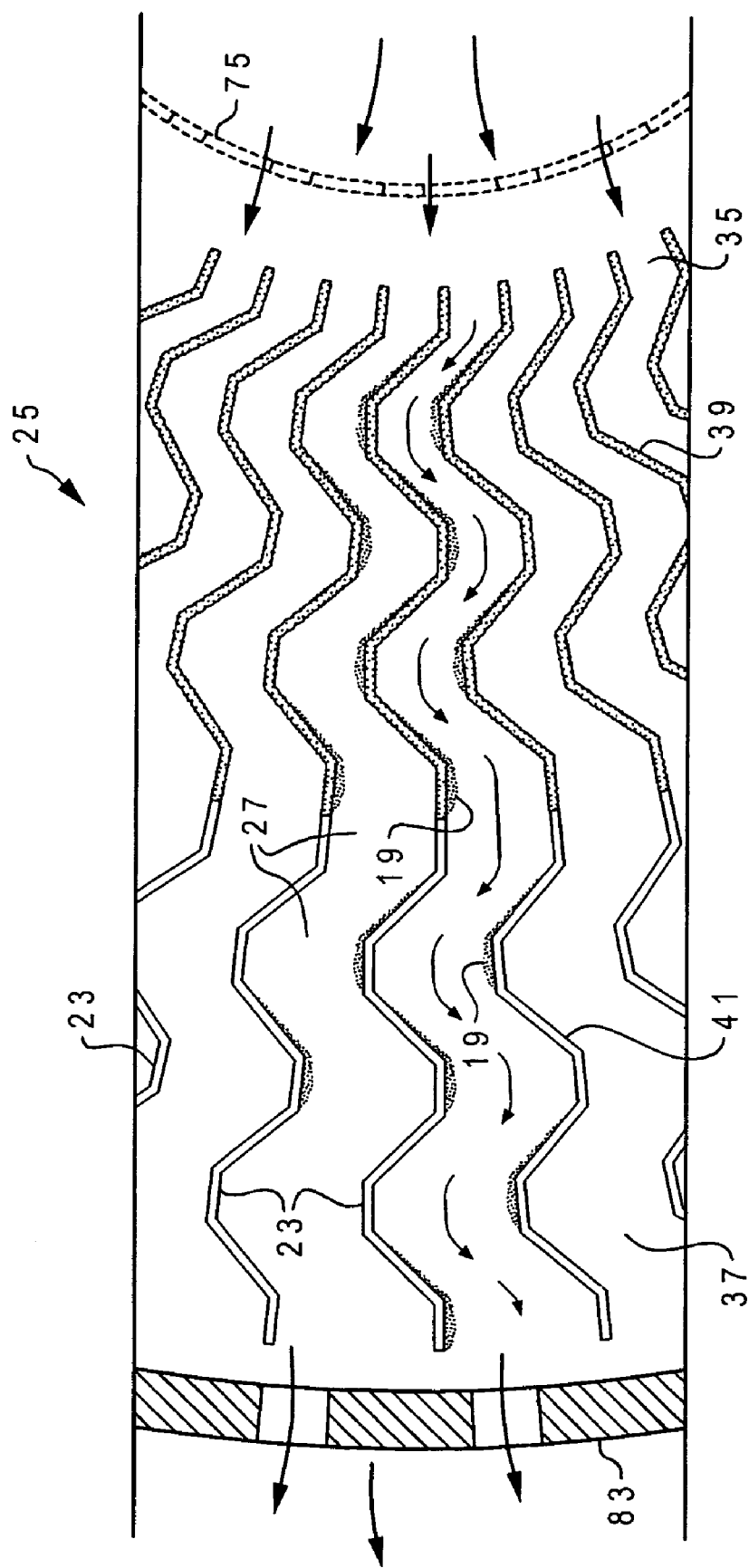
FIG. 3 is a plan view of a portion of a portion of radial array of separator vanes, in accordance with another embodiment, taken through lines III-III of FIG. 8.

FIG. 3 illustrates a radial type of vane assembly 25. Fluid enters the vane assembly from the center. Therefore, the inlet end section has roughened surfaces 39, while the outlet end section has smooth surfaces 41. The individual vanes 23, instead of being generally parallel to one another, are radial extensions from the center. Connecting rings 77 (see FIG. 10) connect the vanes 23 together. Distributor structure 75 is shown. The operation of the vane assembly 25 is substantially the same as the vane assemblies 11 and 11A.

Figure 8:
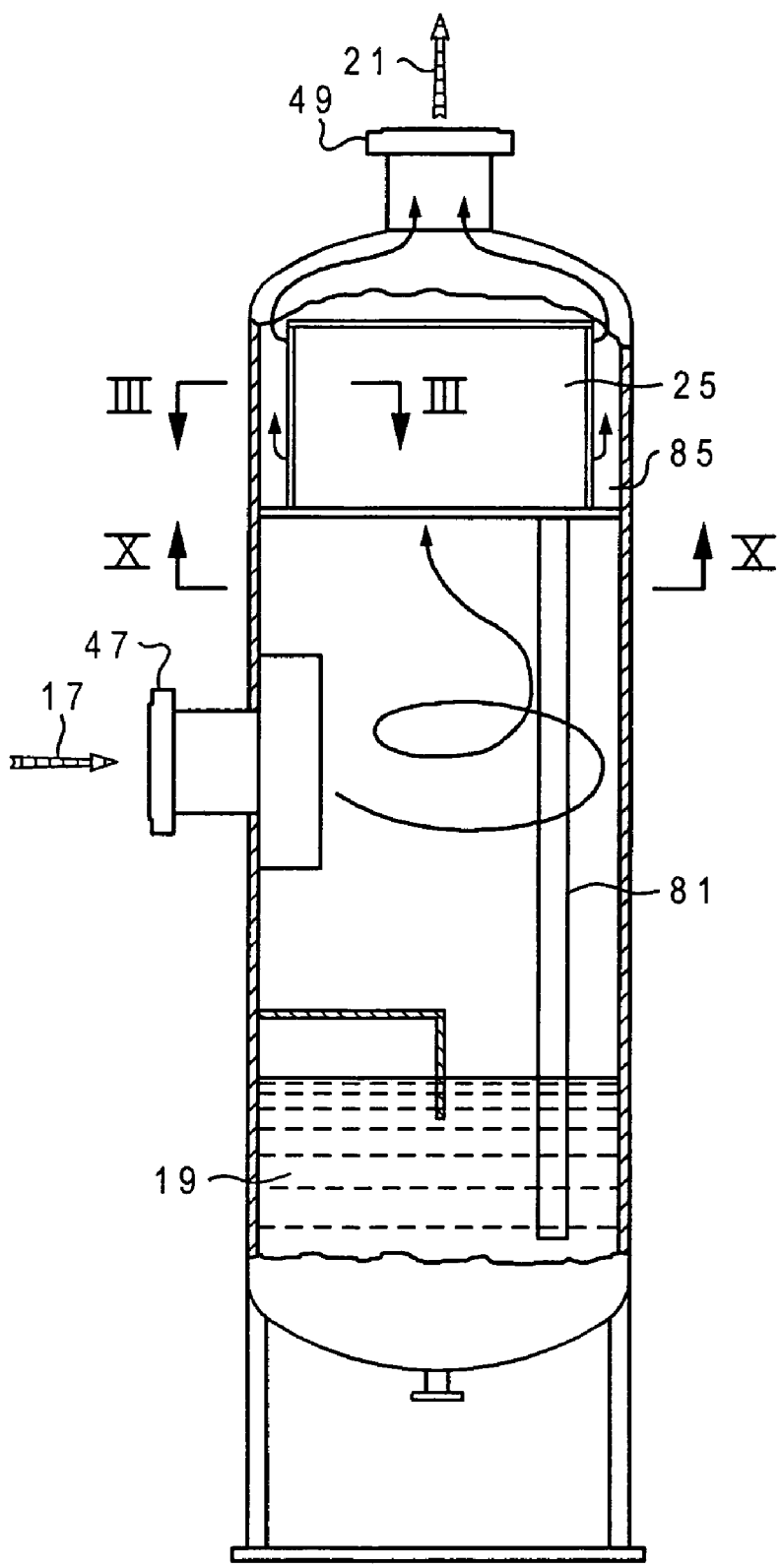
FIG. 8 is an elevational cross-sectional view of a separator vessel, in accordance with still another embodiment, that utilizes the vane array of FIG. 3.
Figure 9:
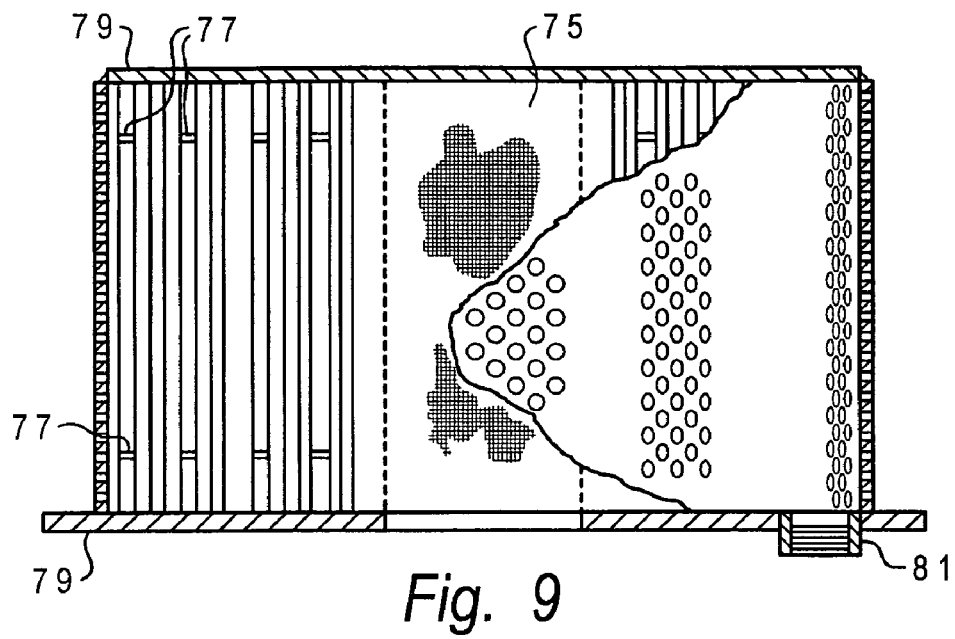
FIG. 9 is an elevational cross-sectional view of the vane array used in FIG. 8.
Figure 10:
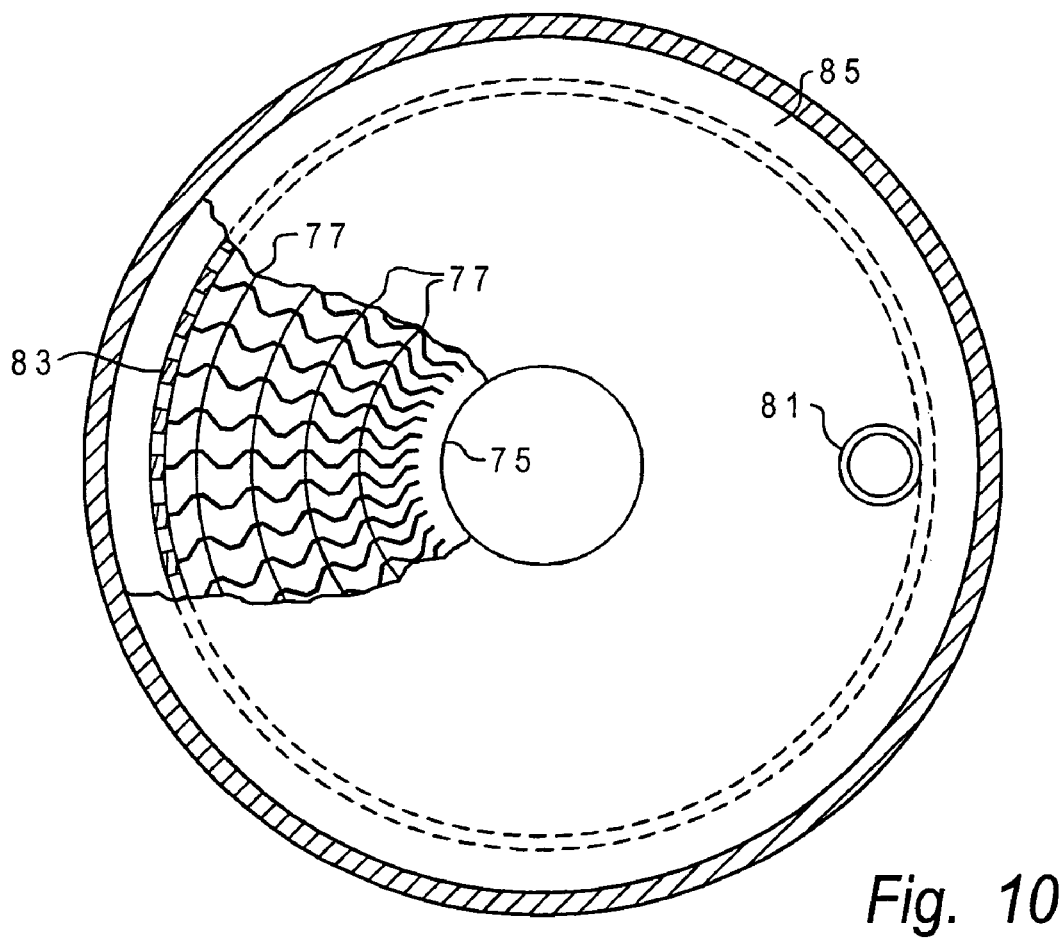
FIG. 10 is a bottom plan, or partial cross-sectional view of the vane array, taken through lines X-X of FIG. 8.

FIGS. 8-10 show a separator using the vane assembly 25. The vessel is vertical with the inlet 47 on a side and the outlet 49 on the upper end. Fluid 17 enters the vessel through the inlet 47 and flows up into the center of the vane assembly 25. The fluid then flows through a distributor 75 (FIGS. 9 and 10) and radially outward between the vanes 23. The top and bottom of the vane assembly 25 are closed by plates 79. The liquid falls to the bottom plate and exits via a drain pipe 81 to the bottom of the vessel. The gas exits the vane assembly through a perforated cylinder 83 around the vanes and enters an annular region 85 where it then flows to the outlet 49.

With the separator of the present invention, wire mesh need not be utilized upstream of the inlet end of the vanes. Consequently, there is less likelihood of clogging or blocking, and fluid flow is unimpeded through the separator. Any particles can be captured by a filter elsewhere in the fluid stream, in an easier-to-clean location.

Separators are sized according to K factors, which represent efficiency. The separator of the present invention has a higher K factor than do prior art separators. Separators of the present invention can be made physically smaller, thereby reducing manufacturing costs. The manufacturing of the vanes is inexpensive, requiring blasting and not any shaping of the vanes.

Furthermore, the separators maintain efficiency, even in the presence of foamable liquids. In prior art separators, foaming of the liquid reduces the separator efficiency as the surface area of the vanes becomes reduced. The roughened surfaces however, reduce the tendency of liquids to foam. Thus, the separator serves as a defoamer.

Figure 11:
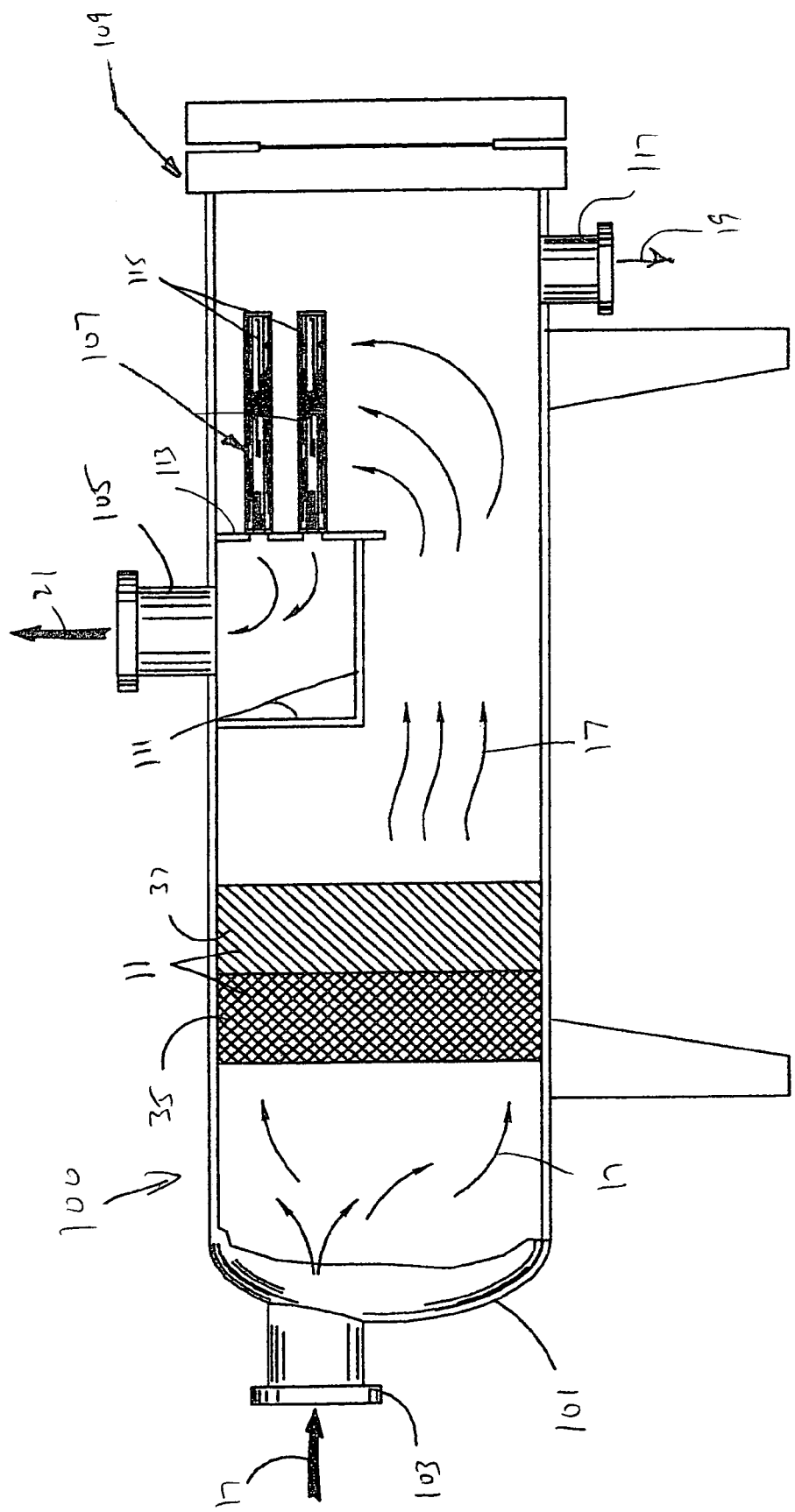
FIG. 11 is an elevational cross-sectional view of a vessel having a separator and filter arrangement, in accordance with one embodiment.
Figure 12:
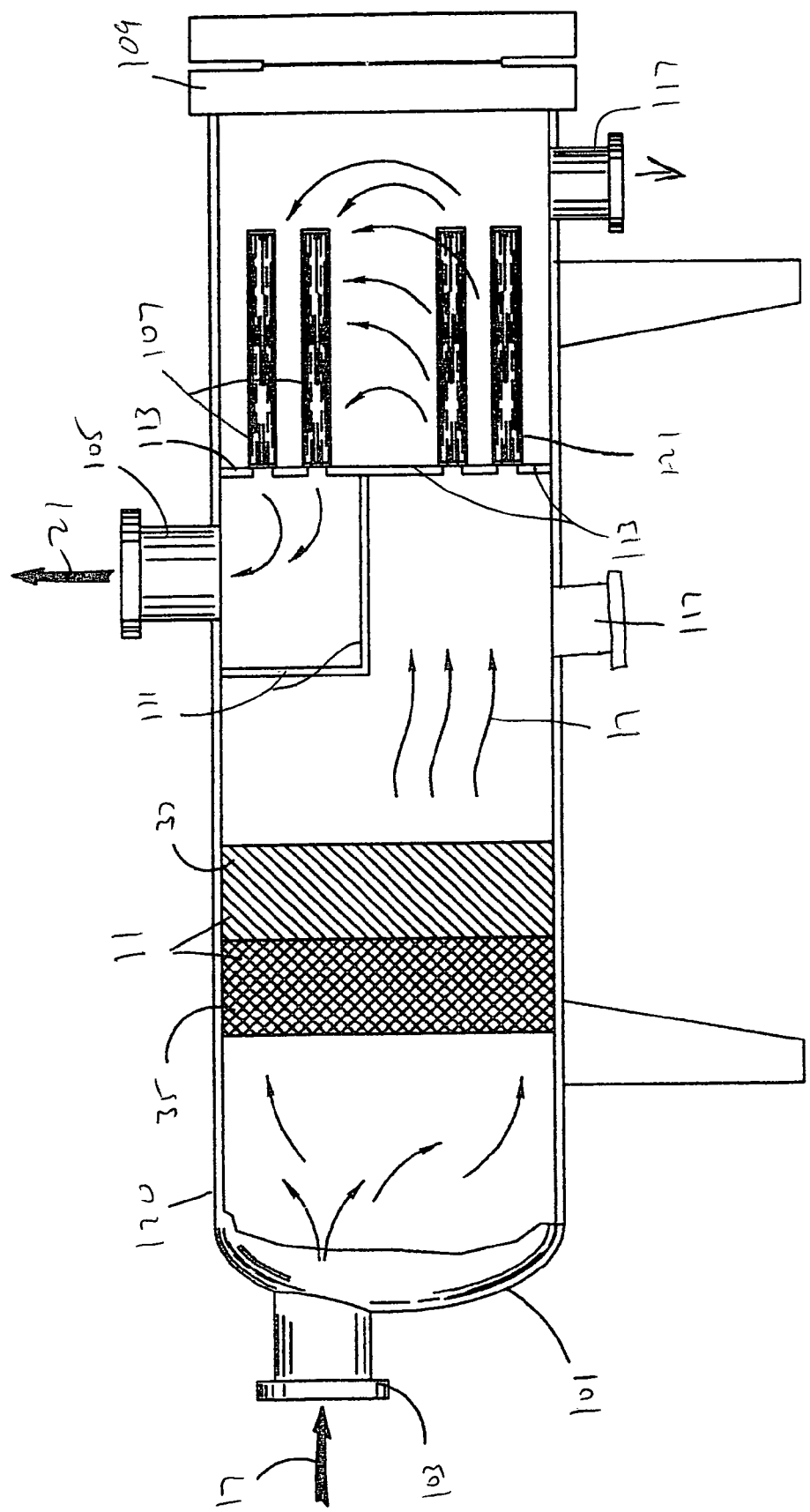
FIG. 12 is an elevational cross-sectional view of a vessel having a separator and filter arrangement, in accordance with another embodiment.

The vane assemblies 11, 11A, 25 can be used in conjunction with other elements in order to further clean and dry the gas. FIGS. 11 and 12 show separators with vane assemblies and filters.

In FIG. 11, the separator 100 has a vessel 101, which in turn has an inlet port 103 and an outlet port 105. Fluid 17 flows into the vessel via the inlet port 103, follows a flow path inside the vessel and then exits the vessel through the outlet port 105. The vane assembly 11 (or 11A or 25) is located in the fluid flow path, with the roughened section 35 located upstream of the smooth section 37. The filters 107 are located in the fluid flow path between the vane assembly 11 and the outlet port 105.

In the preferred embodiment, the filters 107 are located near an end of the vessel, which end has an access opening 109 and an associated door. This allows an operator to easily access the filters 107 for cleaning or changing.

Thus, in the preferred embodiment, the outlet port 105 is located between the vane assembly 11 and the filters 107. In order to direct the fluid flow away from the outlet port 105 and through the filters 107, the outlet port 105 is surrounded by walls 111, 113 or plates. The back wall 113 closest to the access opening 109 has perforations or openings. The back wall 113 supports the filters 107. In the preferred embodiment, there are plural filters, typically arranged in row and columns on the back wall (in FIG. 11, only two filters are shown). Each filter has a perforated tube mounted to the back wall 113, with each tube communicating with the respective opening in the back wall 113. A filter element 115 is located on each perforated tube. The filter elements are conventional and commercially available and can be made of metal, fiberglass, or any other material that controls permeability. The filter elements are sized to capture particles larger than 0.3-75 microns. The filter elements are removable for cleaning or replacement. One type of filter is described in U.S. Pat. Nos. 5,827,430 and 5,893,956.

In operation, the fluid 17 flows along the fluid path as follows: the fluid enters the vessel at the inlet port 103 and flows through the vane assembly 11, as described above. The vane assembly 11, with its roughened surfaces, serves to coalesce liquid in the fluid. Some of this liquid coalesces to particle sizes large enough to drop to the bottom of the vessel 101. Small particles (for example, 10 microns or smaller) will pass through the vane assembly 11. The vane assembly coalesces liquids, even those liquid particles that pass through. Thus, the vane assembly 11 increases the particle size of liquids, removing the larger particles and passing the smaller particles.

The fluid then exists the vane assembly 11 and is diverted away from the outlet port 105 by the walls 111 so as to pass through the filters 107. Thus, the filters 107 are located in the fluid flow path. The liquid and other contaminants are captured by the filters 107. The filters 107 are coalescing elements, wherein as more and more liquid is captured, the liquid coalesces into larger particles and drops to the bottom of the vessel 101. A drain port 117 allows the removal of the liquid 19 from the vessel 101.

The separator 100 achieves synergistic results because the vane assembly 11 coalesces the liquid into larger particles and allows the filters 107 to work more effectively in removing particles and contaminants from the fluid. The vane assembly 11 reduces the amount of small-sized particles that would pass through the filters. The combination is particularly effective in low pressure applications, such as below 75 psi.

The vane assembly and filter arrangement removes much of the contaminants, such as salt and soap, from the fluid. After exiting the separator 100 through the outlet port 105, the fluid 21 flows into a compressor. The time between overhauls of the compressor is greatly extended by the use of the vane assembly and filter arrangement.

Salt is typically dissolved in liquid. Therefore, removing the liquid will also remove the salt. Some salt is in the form of crystals, undissolved in liquid. These crystals are removed by the filters 107. With soap, the vane assembly 11 ruptures or breaks the soap film, enabling the soap to be removed with the liquid.

FIG. 12 shows a separator 120 in accordance with another embodiment. The separator 120 is similar to the separator 100 shown in FIG. 11, but it includes additional filters 121. The back wall 113 or plate extends to the bottom of the vessel 101, where another stage 121, a first stage, of filters is mounted. The second stage 107 of filters is as described above with respect to FIG. 11.

In operation, fluid 17 exits the vane assembly 11 and passes from the inside to the outside of the first stage filters 121. The fluid then passes from the outside to the inside of the second stage filters 107. The first stage filters 121 operates to coalesce liquids (drain ports 117 are on both sides of wall 113). The coalesced liquids drop to the bottom of the vessel for removal by way of the drain port. The second stage of filters 107 operate to filter particulates. In the preferred embodiment, the porosity of the first stage filters 121 is larger than the porosity of the second stage filters 107, in order to prevent the plugging of the first stage filters. In the preferred embodiment, the first stage filters 121 have a porosity of 1.0-50 microns, while the second stage filters 107 have a porosity of 0.3-50 microns.

Although the separators 100, 120 have been described as having a vane assembly with roughened surfaces, the vane assembly need not have roughened surfaces. Instead, the vane assembly could have only smooth surfaces. Some coalescing of the liquid would still occur inside the vane assembly, which vane assembly would enhance the effectiveness of the filters in the coalescing elements 107, 121.

Also, the vane assembly could have all roughened surfaces and little or no smooth surfaces. This is because the roughened surfaces reduce the surface tension of the liquid so as to coalesce the liquid, while the smooth surfaces increase the surface tension of the liquid to allow the liquid to drain off. Instead of using smooth surfaces, the coalesce liquid is captured by the filters 121, 107, wherein the liquid drains to the bottom of the vessel.

The foregoing disclosure and showings made in the drawings are merely illustrative of the principles of this invention and are not to be interpreted in a limiting sense.

The invention claimed is:

1. A separator for separating liquid from gas, comprising:
   a) a vessel having an inlet port, an outlet port and a flow path between the inlet and outlet ports;
   b) a vane assembly located in the flow path and having vanes, the vanes being spaced apart from and adjacent to one another and forming a serpentine path between any two adjacent vanes;
   c) a filter located in the flow path between the vane assembly and the outlet port;
   d) the filter being accessible through an access port in the vessel;
   e) the vessel having two ends, with the inlet port being in one end and the access port being in the other end, the outlet port being located between the vane assembly and the filter and downstream along the flow path from the filter.

2. The separator of claim 1 wherein the vane assembly has an inlet section with roughened surfaces on the vanes and an outlet section with smooth surfaces on the vanes, with the roughened surfaces more wettable than the smooth surfaces.

3. The separator of claim 1 wherein the filter is a second stage filter, further comprising a first stage filter located in the flow path and separate from the second stage filter.

4. A method of separating liquid from a gas stream, comprising the steps of:
   a) flowing the gas stream along a path in a vessel from an inlet to an outlet;

b) from the inlet, directing the gas stream into a plurality of vanes and causing the gas stream to change direction so as to impact the liquid in the gas stream onto the sides of the path and cause the liquid to coalesce;
c) directing the gas with the coalesced liquid along the path through a filter element so as to remove the coalesced liquid;
d) from the filter element, directing the gas to the outlet;
e) the path from the inlet to the outlet first extending away from the inlet and then extending in a direction toward the inlet.

* * * * *